United States Patent [19]

Guthrie et al.

[11] 4,406,703

[45] Sep. 27, 1983

[54] COMPOSITE MATERIALS MADE FROM PLANT FIBERS BONDED WITH PORTLAND CEMENT AND METHOD OF PRODUCING SAME

[75] Inventors: Bernard M. Guthrie; Robert B. Torley, both of Corvallis, Oreg.

[73] Assignee: Permawood International Corporation, Philomath, Oreg.

[21] Appl. No.: 213,040

[22] Filed: Dec. 4, 1980

Related U.S. Application Data

[63] Continuation-in-part of Ser. No. 118,503, Feb. 4, 1980, abandoned.

[51] Int. Cl.³ .............................................. C04B 7/353
[52] U.S. Cl. ........................................... 106/93; 106/99
[58] Field of Search ................... 106/76, 81, 93, 99; 8/115.5, 116

[56] References Cited

U.S. PATENT DOCUMENTS

| | | | |
|---|---|---|---|
| 448,968 | 3/1891 | Lewis | 106/98 |
| 994,922 | 6/1911 | Heckel | 106/92 |
| 1,456,323 | 5/1923 | McPherson et al. | 106/93 |
| 1,569,272 | 1/1926 | Forster | 106/137 |
| 1,571,048 | 1/1926 | Garrow | 8/115.5 |
| 1,762,267 | 6/1930 | Freret | 8/115.5 |
| 2,033,411 | 3/1936 | Carson | 18/47.5 |
| 2,271,443 | 1/1942 | Schuh | 72/36 |
| 2,381,269 | 8/1945 | Elmendorf et al. | 18/47.5 |
| 2,504,579 | 4/1950 | Perl | 106/93 |
| 2,539,904 | 1/1951 | Hansen | 106/93 |
| 2,592,345 | 4/1952 | Schnell et al. | 106/93 |
| 2,623,828 | 12/1952 | Dove | 106/99 |
| 2,658,878 | 11/1953 | Sears | 260/6 |
| 2,672,424 | 3/1954 | Avery et al. | 106/89 |
| 2,672,670 | 3/1954 | Rhodes | 106/99 |
| 2,673,810 | 3/1954 | Ludwig | 106/93 |
| 2,687,556 | 8/1954 | Othmer et al. | 156/62.2 |
| 2,700,796 | 2/1955 | Roman | 156/62.2 |
| 2,758,112 | 8/1956 | Waning | 8/116 R |
| 2,837,435 | 6/1958 | Miller et al. | 106/93 |
| 3,021,244 | 2/1962 | Meiler | 156/30 |
| 3,062,669 | 11/1962 | Dilnot | 106/87 |
| 3,264,125 | 8/1966 | Bourlin | 106/76 |
| 3,271,492 | 9/1966 | Elmendorf | 264/122 |
| 3,311,483 | 3/1967 | Garnier et al. | 106/93 |
| 3,391,233 | 7/1968 | Polovtsoff | 264/113 |
| 3,438,853 | 4/1969 | Haines, Jr. et al. | 162/164 |
| 3,478,137 | 11/1969 | Barshefsky et al. | 264/118 |
| 3,520,707 | 7/1970 | Steinberg et al. | 106/93 |
| 3,542,629 | 11/1970 | Burkner | 156/558 |
| 3,615,787 | 10/1971 | Teramoto et al. | 106/102 |
| 3,649,316 | 3/1972 | Uno et al. | 106/89 |
| 3,649,397 | 3/1972 | Peters | 156/622 |
| 3,671,615 | 6/1972 | Price | 264/39 |
| 3,705,837 | 12/1972 | Breslauer | 161/168 |
| 3,748,160 | 7/1973 | Carbajal | 106/99 |
| 3,839,523 | 10/1974 | Lobenhoffer et al. | 264/115 |
| 3,841,885 | 10/1974 | Jakel | 106/93 |
| 3,891,738 | 6/1975 | Shen | 264/101 |
| 3,956,227 | 5/1976 | Foley et al. | 260/38 |
| 3,969,459 | 7/1976 | Fremont et al. | 264/109 |
| 3,972,972 | 8/1976 | Yano et al. | 264/117 |
| 3,981,950 | 9/1976 | Pletzer et al. | 264/109 |
| 3,995,003 | 11/1976 | Potter et al. | 264/122 |
| 4,005,162 | 1/1977 | Bucking | 265/25 |
| 4,044,087 | 8/1977 | Robitschek et al. | 264/113 |
| 4,046,955 | 9/1977 | Bye | 428/479 |
| 4,058,580 | 11/1977 | Flanders | 264/113 |
| 4,082,563 | 4/1978 | Ellis et al. | 106/90 |
| 4,087,285 | 5/1978 | Kurg | 160/52 |
| 4,132,555 | 1/1979 | Barrable | 106/90 |
| 4,132,558 | 1/1979 | Uchikawa et al. | 106/104 |

*Primary Examiner*—James Poer
*Attorney, Agent, or Firm*—Klarquist, Sparkman, Campbell, Leigh, Whinston & Dellett

[57] ABSTRACT

The specification discloses a method of producing composite building materials from a mixture of plant fibers bonded with portland cement. Plant fibers, cement and soluble silicates in certain proportions are mixed and heated under pressure for a short period to get physically stable product that can be cured under atmospheric conditions to full strength. The plant fibers may initially be pretreated with an aqueous solution containing dichromate or permanganate ion prior to adding the cement to negate the adverse effects of set inhibiting water-soluble compounds in the fiber. Other chemicals may be added to modify the reaction and improve the product.

37 Claims, 3 Drawing Figures

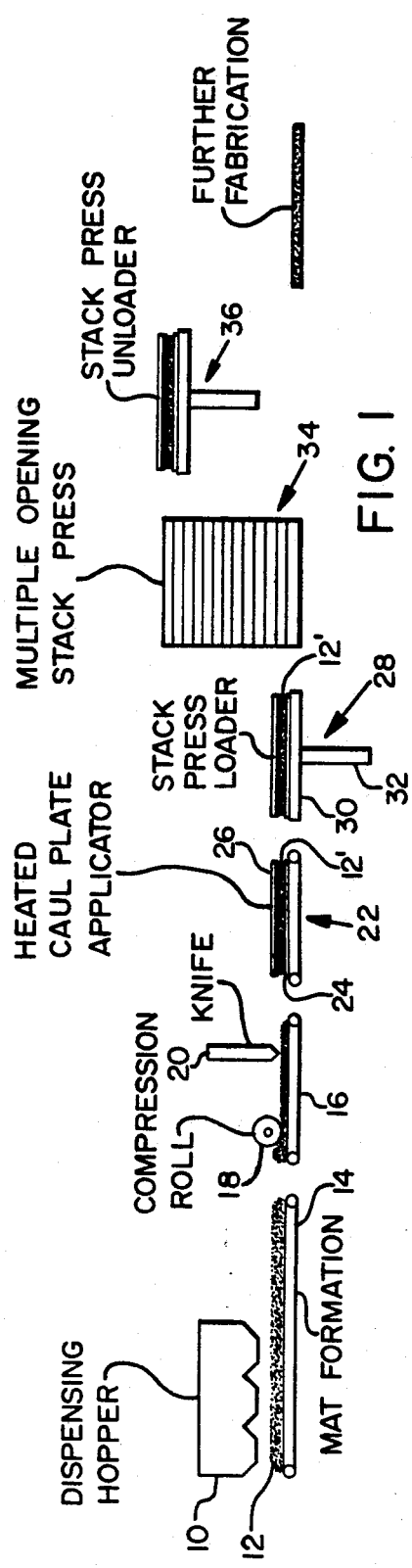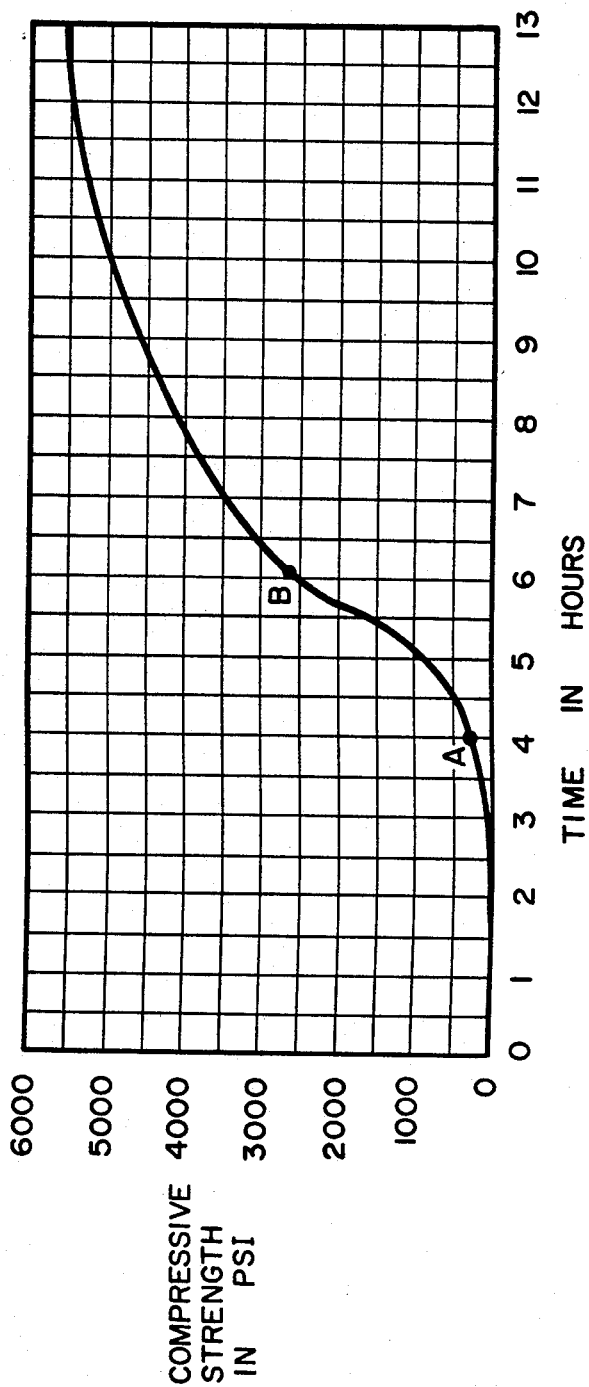

COMPOSITE MATERIALS MADE FROM PLANT FIBERS BONDED WITH PORTLAND CEMENT AND METHOD OF PRODUCING SAME

RELATED APPLICATION

This application is a continuation-in-part of our copending application Ser. No. 118,503, filed Feb. 4, 1980 now abandoned.

BACKGROUND OF THE INVENTION

The present invention relates generally to roofing and siding construction materials. More particularly, the present invention concerns a method of producing such construction materials from a mixture of plant fibers and portland cement.

There is an ever-increasing demand for construction materials having some or all of the following characteristics: relatively light weight, fireproof, waterproof, nailable, odorless, insulative and relatively inexpensive. In spite of the attractive properties of a dense building material consisting of plant fibers such as wood fibers bonded with portland cement, no such product has effectively been marketed. Only porous products consisting of excelsior bonded with portland cement or a magnesium oxychloride cement have seen limited use. It is difficult to bond portland cement to plant fibers because water-soluble compounds in the fibers inhibit the setting of the cement. Among these compounds are hemicelluloses, tannins, sugars and others. Heretofore, an effective agent for negating the adverse effects of these water-soluble compounds in the fibers has not been discovered.

Another problem is the effect of the motion of the fibers during the setting of the portland cement. Any springback of the fibers after being compressed or swelling and/or shrinking with absorption or desorption of water during the setting of the portland cement will fracture the tiny crystallities of cement as they slowly form. Since the strength of the cement depends on the intermeshing of these crystallites, their disruption will greatly weaken the cured product.

Heretofore efforts to control the adverse effects of these water-soluble inhibitors in a wood or other similar fiber composite material utilizing portland cement as a binder, have resulted in five different approaches:

(1) extracting the inhibitors;
(2) accelerating the rate of set of the portland cement;
(3) increasing the strength of the composite material by the addition of resins;
(4) coating the surfaces of the fiber particles with materials compatible with cement (mineralization); and
(5) changing the composition of the portland cement to obtain a material less sensitive to the inhibiting action of the water-soluble compounds.

To date, none of these approaches has been economically successful.

SUMMARY OF THE INVENTION

Among the objects and advantages of the present invention are to provide:

low cost composite building materials particularly adapted for exterior use;
composite building materials made from plant fibers bonded with portland cement having the following properties:

(1) a weight which is substantially less than that of comparable composite building materials made from a sand/cement mixture;
(2) a resistance to fire;
(3) an ability to be nailed into place;
(4) an ability to be molded into attractive shapes or sheets, and sawed with readily available tools;
(5) sufficient strength to withstand blows from hammers during construction without cracking; and
(6) resistance to the deleterious effects of sunlight, rain, freeze-thaw conditions and insects;

a process for manufacturing building materials of the aforementioned type which does not produce ecologically harmful effluents;

building materials made from a plant fiber/portland cement mixture in which the adverse cement set inhibiting effects of the water-soluble compounds in the fiber are effectively negated;

a process of manufacturing building materials from the aforementioned mixture in which the time that portions of the mixture must be held under compression is reduced to a minimum; and a method of producing composite building materials from a mixture of plant fibers with portland cement in which a wide variety of plant fibers may be utilized.

In accordance with the present invention, composite articles of portland cement and fibrous material obtained from various plants are formed by mixing the fibers with portland cement and a water soluble silicate, the latter being present in amount by weight greater than about four percent of the weight of the portland cement and up to about twenty-four percent, and thereafter maintaining the mixture under pressure while heating the same to a temperature sufficient substantially to accelerate the setting of the mixture. This causes the mixture to set sufficiently hard to prevent springback or swelling of the fibers thus permitting the application of pressure to be terminated in a short time and the formed article or composite to be cured to final strength without further application of pressure or heat. When fibers containing large amounts of cement set inhibiting chemicals are being used the fibers preferably are treated with an aqueous solution of a dichromate or permangenate salt prior to mixing them with the portland cement and water soluble silicate. Various process modifications may be made as described in more detail hereinafter. We have discovered that dichromate or permanganate treatment of the fibrous material somehow inhibits the usual adverse effect on the setting of portland cement which has been observed with some fibrous plant material.

Other objects and advantages of the present invention will be apparent from the following detailed description of a preferred embodiment thereof and from the attached drawings.

BRIEF DESCRIPTION OF THE DRAWINGS

FIG. 1 is a general schematic illustration of the overall operation of the manufacturing process; and FIG. 2 is a graph showing the relationship between compressive strength and curing time for concrete.

DETAILED DESCRIPTION OF THE INVENTION

Figure 3:
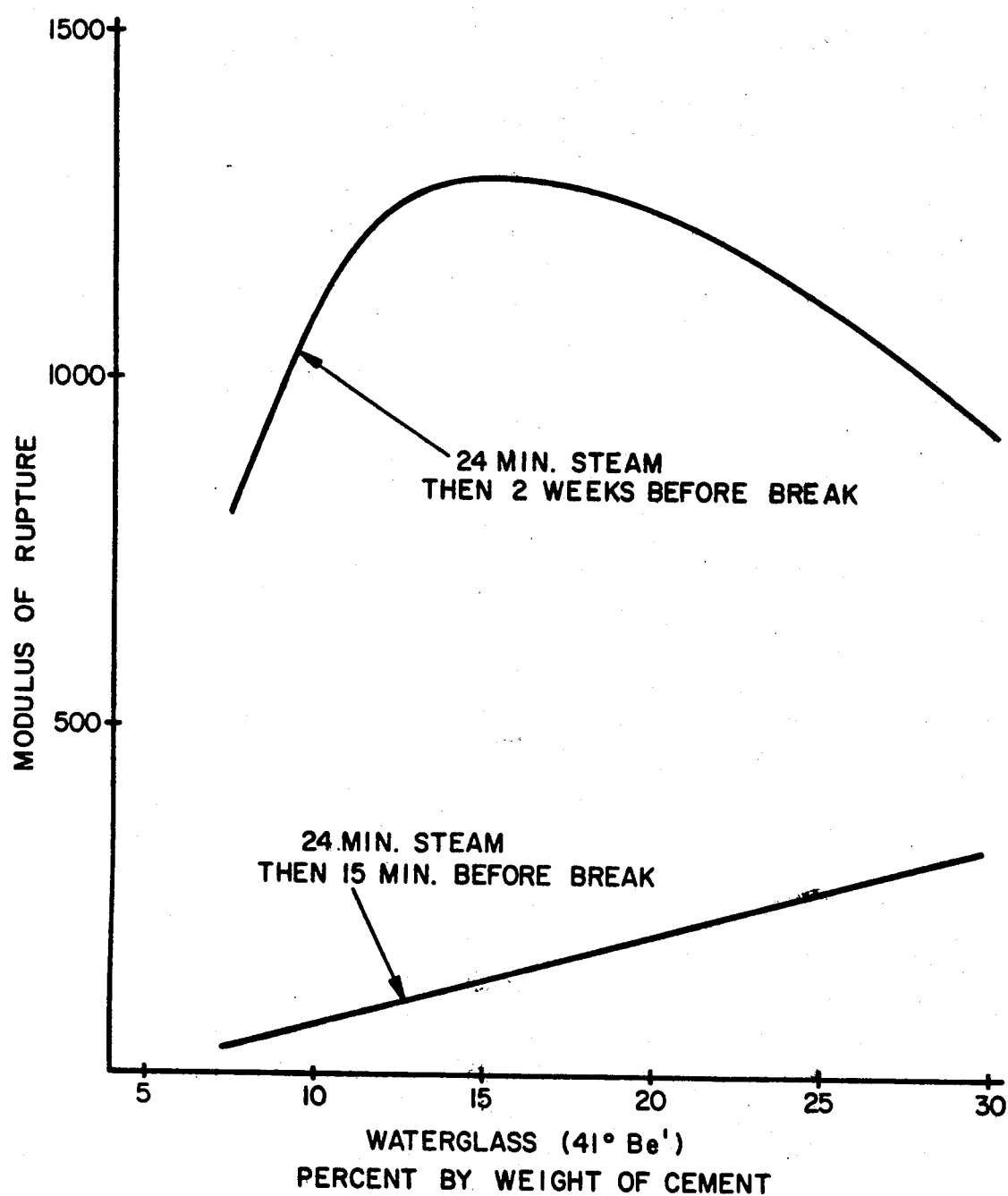
FIG. 3 is a graph illustrating the effect of the addition of sodium silicate upon the strength of a portland cement-fiber mixture.

In accordance with a preferred embodiment of the invention, plant fibers are mixed with a soluble silicate such as an alkali metal silicate solution (water glass) and portland cement. This mixture is placed in molds and compressed. It is then subjected to heat so as to raise the temperature of the mixture to greater than 140° F. such as by placing it in an atmosphere of live steam. This causes the mixture to set up sufficiently within a short period of time, i.e., within fifteen to sixty minutes, as to resist any tendency of the fibers to swell or springback. Thus, the pressure applied to the molded articles can be relieved and the articles permitted further to cure at ambient temperatures to final strength. The articles will have enough strength after fifteen or twenty minutes in the mold to permit trimming and sawing to be performed. Within about twenty four hours, the articles will have about eighty percent of their ultimate strength and could be shipped at that time. Longer periods in the molds will increase the out-of-mold strength.

It has been found that the alkali metal silicate should be present in concentration greater than about four percent dry weight in proportion to the amount of portland cement. Such amount, by some mechanism not understood, causes the mixture rapidly to set up when heated, thus eliminating the need to maintain a molded article under pressure a lengthy period.

When fibers containing amounts of set inhibiting compounds sufficient to interfere with the set of the cement are utilized, it has been found the deleterious effect of such compounds can be negated or diminished in large part by pretreating the plant fibers with an aqueous solution of an alkali metal or other water soluble salt of dichromate or permanganate ion. The wetted fibers are allowed to stand for a period of time sufficient to permit the dichromate or permanganate ion to react with substantially all of the cement set inhibiting compounds in or near the surface of the fibers. Thereafter, the silicate material and portland cement are added to the now treated wood fibers, with or without other useful chemicals, and the mixture is molded under pressure as described above. The residual products of the pretreatment do not harm the strength of the cement, nor does the treatment when properly controlled appear to degrade the strength of the fibers.

In the case of dichromate ion, the reaction with the fibers can be accelerated by acidifying the dichromate solution. In such a case it is necessary after fiber treatment to neutralize the remaining solution at the conclusion of the dichromate treatment period with a suitable alkaline solution or solid. It may be desirable in some instances to add a cement set accelerator along with the portland cement in order to reduce the molding time.

Prior to treating the fiber with the dichromate solution, the fiber may first be treated with a sulfite solution. This treatment enhances the strength of the composite product by a mechanism discussed subsequently.

In the case of treatment with permanganate ion, the permanganate solution is preferably on the alkaline side.

Plant Fibers

Different plant fibers have varying types and amounts of water-soluble compounds therein which can inhibit the setting of the portland cement. Some, such as hemlock, have little or none. On the other hand, western red cedar has a high percentage of such compounds, but because of the resistance of the fiber thereof to decay and insect attack, it is a useful source of fiber for the composites of the invention. Other woods such as douglas fir are less difficult to bond with portland cement but dichromate treatment does lessen the setting time of cement mixed with douglas fir fibers. The present invention may also be extended to fibers of hard woods such as oak and walnut and of other plant materials, such as, for example, straw, bagasse, sisal, and the like, which have relatively high tensile strength since it is contribution of this property of the fibrous material which is sought.

The fiber mixed with the cement can be in any of a variety of forms depending upon the nature of the fiber source, the geometry of the finished articles and the characteristics or qualities desired in such articles. The fiber can be in the form of strands or stringy material when made from grasses, bagasse, cedar bark, and like sources and a product of maximum tensile strength is desired. Wood flakes or planer shavings as used in composite resin bonded products heretofore can also be used. If a product with a smoother surface is desired, wood can be used in the form of the product produced by hammer milling wood flakes or planer shavings and passing them through screens having openings of selected maximum size which may be from 1/16 inch to ⅜ inch depending upon the qualities desired in the finished product.

Soluble Silicate

We have found that the incorporation of a substantial quantity of a soluble silicate in the fiber-cement mix enables the mix to be set up rapidly, i.e. within one hour or less, by the application of heat, to the point where the set mass is dimensionally stable and has sufficient strength that it can be removed from a pressure mold and allowed to cure further under ambient atmospheric conditions. Thus the pressure mold used for the initial set is quickly available for reuse.

The soluble silicate is preferably added as water glass or potash waterglass. It can be mixed with the fibers before mixing with the portland cement or it can be added after the cement and fibers have been mixed if added as a freshly prepared gel. The silicate can also be added in the dry form if sufficient water is also added to dissolve the same.

We have found that with Douglas fir fiber, if the silicate is present as 41°Be' waterglass in amount greater than about eight percent based on the dry weight of portland cement, the fiber-portland cement mix can be set by the application of heat and pressure within fifteen to twenty minutes to a relatively dimensionally stable condition. Preferably the water glass is present in amount between eight and sixteen percent of the cement. Increase in the percentage of waterglass up to about twelve percent will further increase the dimensional stability of the product. However, still further increase in the amount of waterglass does not improve the dimensional stability of the product. Moreover, the ultimate strength of the product reaches a maximum when waterglass is present between about twelve and sixteen percent. On the other hand the out-of-the mold strength increases substantially proportionately to the amount of waterglass present. See FIG. 3.

Treating Agent

Dichromate ion is the base agent which we have found to have the capability significantly to negate the adverse effects of the cement set inhibitors in plant fibers. However, we have found that permanganate ion also shows a capability in this respect, although to a lesser extent than dichromate ion. Because dichromate ion treatment is much to be preferred, the following detailed description will focus primarily on the use of such ion.

The dichromate ion or permanganate may be supplied in the form of alkali metal or other soluble salt. Two readily available sources of dichromate ion are potassium dichromate and sodium dichromate dihydrate. Other water-soluble metal dichromates, e.g. calcium dichromate, may also be utilized.

Dichromates are considered to be a potentially hazardous chemical. Therefore, it is desirable that water-soluble dichromate essentially be absent from the finished product. Enough dichromate ion must be present during the pretreatment of the fibrous material to ensure essentially complete reaction of the cement set inhibitors on the surface of the material with dichromate.

The manner in which the dichromate ion reacts with the water-soluble plant compounds to negate their cement set inhibiting effects is not completely understood by us. In the finished product it is possible that the chromium ends up as insoluble chromic oxide ($Cr_2O_3$) which may be chemically bound up with the hardened cement or with the original soluble compounds in the plant fibers, or both.

It has been determined that dichromate ion must be present in the aqueous pretreating mixture in an amount ranging from approximately 0.5% to approximately 8% of the oven dry weight of the fibrous material. The precise amount of dichromate necessary will depend upon the fibrous material since they vary widely in the types and amounts of water soluble compounds which inhibit the setting of portland cement. The amount of dichromate ion added is that amount which is just sufficient to react with the inhibitors present at or near the surface of the fibrous material being treated, as determined by experimentation.

In the fiber particles, particularly of wood, absorb water during the initial stages of the set of the concrete, the subsequent swelling or other shifting or curling of the particles will disturb the growth of the cement crystallites and seriously weaken the final strength of the composite product. Therefore, it is important that this water absorption be completed by saturating the fibers before the onset of the cure of the cement. This saturation is preferably accomplished during the treatment of the fibers with the dichromate by mixing the fibers with an aqueous solution of the dichromate salt having more water present than is required to saturate the fibers.

The water required for the hydration of the cement can be computed as being about 25% of the cement present. Sources of water to meet this requirement—as in the case of the saturation of the fibers—can be water available from the solutions of the chemicals and from free water if necessary. From many experiments with various wood fibers, we have determined that the total water necessary is the amount required to saturate the wood fiber plus 25% of the weight of the portland cement present. Wood will absorb moisture to about 30% of its wet weight. Thus, the amount to saturate wood fibers is equal to $$\frac{\text{oven dry weight of fibers}}{0.7} - \text{oven dry weight of fibers.}$$

For composites of acceptable strengths, the weights of the composites after air drying were plus or minus about 10–15% of the empirical values calculated as described.

In practice, additional water in the amount of an excess of 20–40% of the theoretical water were added to facilitate the chemical treatments of the fibers and to improve the mixing and molding characteristics of the composite.

The length of time necessary for the appropriate action of the dichromate on the fibers depends on a number of factors such as the concentration of the solution of the dichromate being used, the reaction temperature, the structure of the fibers, the various chemical substances naturally present in the fibers and their amounts, the acidity of the aqueous phase and the possible presence of a surface active (surfactant) material. However, the actual time of treatment can only be determined experimentally.

It will be recalled that it is an object of the invention that the time required for the composite to be held under pressure in the mold be as short as possible, to increase the production rate of composite products and lower the manufacturing costs by efficient use of press and molds. Only enough press time should be allowed that the composite product, when released from the mold, will retain its structural stability during the final set of the portland cement.

It has been found that acceptable production rates can be realized with mold retention times from 30 to 90 minutes, although using waterglass in the quantities hereinbefore mentioned enables the mold retention time to be reduced to as short as fifteen minutes. In order to accomplish this production rate, the quantity of the cement set inhibitors, if present in the fiber in substantial amount, must be reduced so that they will not escape from the fibers and act on the cement even at the elevated temperatures used during the molding cycle.

The necessary period for the dichromate ion to react with the cement-set inhibitors so as to attain such production rate will vary as indicated above. With some fibers such as hemlock, little or no reaction time is required. With douglas fir which is recently cut, a few minutes at room temperature may suffice. With more difficult fibers such as western red cedar, 10 or 15 minutes at the temperature of boiling water may be required. It is desirable that in carrying out these reactions the concentration of dichromate be limited to provide the amount needed, the acidity level be adjusted to provide sufficient speed of the reaction, and the lowest effective temperature used. The levels of these operating parameters must be determined experimentally with the fiber species to be used. Departure from the peferred conditions may cause loss of strength in the cured composite product because of degradation of the fibers as well as poor cure of the cement.

Depending on the fiber, sodium dichromate dihydrate in the amount of 0.5–8% of the fiber (dry weight) being treated is adequate to react with the cement set inhibitors.

During the dichromate treatment, surfactants should be avoided. They ct to accelerate the release of the cement set inhibitors, thus disturbing the desired chemical condition at the interface between the fibers and the portland cement. In fact, if a surfactant is present at this point, the final product strength can be seriously impaired.

It should be understood that separate treatment of the wood with dichromate prior to the addition of the portland cement is not absolutely necessary. The dichromate could be added to an already prepared moist wood fibers/portland cement mixture. However, the strength of the final product is better if the fibers are pretreated with dichromate before the addition of the cement. The last mentioned technique ensures that the set inhibitors are substantially negated before the cement contacts the fiber.

The Acidifying Agent

A wide variety of acidifiers may be utilized. It has been found that aluminum sulfate provides a good level of acidity, somewhat buffered by the hydrolytic capacity of the aluminum ion. On the other hand, unbuffered sulfuric acid is harmful. Aluminum chloride may also be used but it is desirable not to have the corrosive chloride ion present. Other acidic salts may also be useful but have not yet been tried.

Usually, aluminum sulfate to the extent of 0.5 to 6% of the fiber weight is adequate.

The Reducing Agent

The use of sulfurous acid has been shown to be beneficial in our process for bonding wood fibers to portland cement, although the mechanism is not understood. If the wood such as fir is first treated with a dilute, weakly acid solution of sodium sulfite followed by the addition of dichromate and then waterglass and cement, a substantially increased strength of the composite is obtained. Moreover, any excess of dichromate over that normally required for the reaction with the fibers is reduced and thus removed. The weakly acid system can be achieved by mixing a solution of sodium sulfite with a solution of alum, using a solution of sodium bisulfite, or using a solution of sodium thiosulfate (hyposulfite). Strongly acidic solutions must be avoided to prevent damage to the cellulose fibers.

The Alkaline Agent

After the completion of the dichromate treatment, the solution remaining on the fibers is a weakly acidic solution of chromium sulfate and aluminum sulfate, or chromium chloride and aluminum chloride, etc., depending on the acidic system used. In order to provide a neutral condition more favorable to the setting of the portland cement, this acidity of the fibers should be neutralized by the controlled addition of an alkaline substance to bring the pH to 7.0 or above. Aqueous solutions of sodium hydroxide, potassium hydroxide, sodium carbonate and the like may be used. Solids such as lime (calcium oxide) may also be used but their performances will be less satisfactory because of the necessity of their first dissolving in the moisture present. For example, slaked lime is only sparingly soluble and thus the neutralization reaction progresses slowly.

The substance preferred is sodium silicate. Even in small amounts it has the advantage of precipitating calcium, aluminum and chromium silicates which might act as cements, mineralize the fiber surfaces, and impart a degree of waterproofness to the composite product. The mineralization technique is discussed in U.S. Pat. No. 2,623,828 issued to Dove. If waterglass solution is utilized instead of a solid alkaline substance, the water in the solution must be taken into account when establishing the appropriate portions to yield the desired water/cement ratio.

The solution of sodium silicate preferably used is a 2:1 dilution of 41° Be sodium silicate in water. For neutralization of a 20% aluminum sulfate acidifying solution, a ratio of at least twice the volume of sodium silicate solution for each volume of aluminum sulfate solution is preferred. Again, the proper water balance must be observed and higher or lower concentrations of the sodium silicate may be used as the case may require. In particular, higher concentrations may be utilized to obtain a rapid set at elevated temperatures as hereinbefore described.

The Portland Cement

Type III portland cement is preferred because of its high early strength characteristic. Type I–II portland cement may also be used, however. The cement is mixed with the moist fibers after the completion of the dichromate reaction, if such is carried out, and preferably after addition of the alkalizing agent and adjustment of the pH level thereof to a more or less neutral state. Other more rapidly setting cements such as REGULATED SET (trademark) may also be utilized in order to minimize the deleterious effects of the cement set inhibitors in the fibers. However, they are much more expensive than portland cement and may have other detracting properties.

The ratio of portland cement to fibers has a strong relationship to the ultimate strength characteristics of the finished product. The cement/fiber ratios may be vaired considerably, producing products having somewhat differing characteristics. In general, the more dense the finished composite material (achieved by greater compression), the better is its weather proofness and strength when the fiber to cement ratio is constant. On the other hand, for strength only, there is an optimum ratio of fiber to cement depending upon the type of fiber used. In the case of wood fiber ratios ranging from approximately 0.5:1 to approximately 4:1, of portland cement to oven dry wood fiber, according to weight, will produce composite materials of acceptable strength and weathering properties. Strength appears to peak at cement/wood fibers ratio of approximately 1.3:1 to approximately 1.7:1. Size and shape of the particles are also important. Generally, acicular particles or flat blades are superior to short, stubby particles.

At the higher end of the preferred range mentioned above, e.g. portland cement to fiber ratios of approximately 2.75 or so, higher densities above 75 pounds per cubic foot will be obtained, especially at pressures in the press over 150 psi. At ratios of 1.3 to 1.5:1 and pressures of 500 psi, products having densities of 65-75 pounds per cubic foot are readily prepared.

The Cement Set Accelerating Agent

Depending on the fibers being used and cement setting rates desired, it may be desired to add a set accelerating agent to the mixture. One well known suitable accelerating agent is calcium chloride. It increases the speed of the initial set of the portland cement but does not materially affect the final strength thereof. Thus in a few hours, concrete containing a small amount of calcium chloride will show higher compressive strength than concrete containing no calcium chloride, but the two samples will have the same strength after twenty-eight days of curing. Other salts such as sodium sulfate or sodium chloride may also be employed.

A number of important advantages are obtained through the addition of a suitable accelerating agent. Such a substance will speed the curing of cement at the interface between the wood fibers and the cement so as to partially offset the retarding effects of the inhibitors in the wood fibers. However, depending on the fiber compositions being used, the mere addition of calcium chloride to the aqueous wood fibers/portland cement mixture, without pre-treatment with dichromate, can result in composite materials of markedly less strength than if dichromate is used.

It is important that the calcium chloride, if used, be added immediately prior to the addition of the cement. This promotes the concentration of the accelerator at the interface between the fiber and the cement.

Triethanolamine (hereinafter referred to as TEA) has been reported to be useful as an accelerator for the cure of portland cement when used in small quantities. We found it to be effective for our system but care must be taken to keep the amount small and to add it after the addition of the cement. The substance acts at least to some extent as a surfactant and if added before the cement, it apparently causes the release of additional and harmful quantities of the compounds which retard the set of portland cement.

The advantage of using TEA rather than calcium chloride as an accelerator is that TEA is far less corrosive than the calcium chloride and therefore much more useful when metals—such as nails, reinforcing rods, etc.—are to be in contact with the product.

Advantage may also be taken of the process by which the portland cement sets. FIG. 2 depicts a graph showing the relationship between compressive strength and curing time for a typical concrete mixture. Point A on the curve of FIG. 2 is arbitrarily selected for illustrative purposes as the point at which the concrete mixture must be placed in the mold. Placement before this point would waste mold time, and placement after this point would reduce final strength of the product as crystal formations would have advanced beyond the point where they could be disturbed without serious damage. Point B in FIG. 2 is arbitrarily selected for illustrative purposes as the point at which the curing of the concrete has advanced sufficiently to ensure dimensional stability upon removal of the product from the molds. Thus, the curing cycle of the concrete is divided into three phases:

Phase I: The induction of pre-curing phase between mixing and point A;
Phase II: The molding phase between point A and point B when the product is in the mold;
Phase III: The curing phase after the product has been removed from the mold.

In the actual manufacturing operation, it may be desirable to permit the final mixture to pre-cure a predetermined time before placing it in the molds. This will reduce the amount of time that the mixture must remain under compression in molds. This is important from an economic viewpoint because stack press machines (hereafter described) which are effective to form products from the present mixture are expensive. By minimizing the molding time a given stack press can be utilized more efficiently to produce a maximum amount of product.

It should be emphasized that points A and B on the curve of FIG. 2 are arbitrarily selected for illustrative purposes and must be accurately determined by experimentation for a given fibers/portland cement system depending upon its composition. When higher concentrations of silicates, i.e., greater than four percent of the cement, are used, the mixed products can be put in molds immediately after mixing and placed in the press.

The accelerated curing rate permits the precure step to be bypassed. The method of the present invention is keyed or coordinated with the curing cycle of the particular concrete mixture (the fibers/portland cement mixture) in order to reduce molding time and thereby achieve a continuous production of a large quantity of product with a minimum amount of capital investment for equipment.

The Molding Parameters

A composite product with superior strength and surface texture can be formed from a fibers/portland cement mixture by molding the same under compression at an elevated temperature. A molding pressure of between approximately 150 psi and approximately 600 psi at a molding temperature of between approximately 120° F. and approximately 220° F. will produce useful products. If soluble silicate is present in amounts less than equivalent to about eight percent 41° Be' waterglass, a molding time of one hour or more will be required. However, if the silicate is increased to the equivalent of twelve to sixteen percent waterglass, the molding time can be reduced to as short as fifteen minutes for a five-eights inch thick product. Satisfactory products can be obtained by molding at ambient temperatures, but the molding time must be extended substantially. The optimum molding pressure and temperature must be determined experimentally and will depend upon primarily the composition of the fibers, the type of portland cement used, and the presence of an accelerator. A molding pressure of approximately 400 psi to approximately 500 psi and a molding temperature of approximately 150°-170° F. have been found to produce good results for the wood fibers/cement mixtures experimentally tested by us. It is preferable that such a mixture be maintained at a temperature of approximately 150°-190° F. throughout the molding operation. In order to accomplish this, a live steam atmosphere may be utilized as later explained. A humidified atmosphere during molding is helpful depending on the design of the molds since it prevents undue loss of moisture which might otherwise occur at the elevated molding temperatures. Excessive moisture loss weakens the finished product.

EXAMPLES

A number of experiments were performed in order to confirm the advantageous effects of soluble silicates and dichromate ion or permanganate ion in a wood fibers/portland cement composite. Standardized procedures were used so that comparisons between many different samples were prepared from a variety of woods and cement would be meaningful. Mixing was done by hand to the extent that a reasonably homogeneous mix was obtained. Usually a mixing time of not less than two minutes was required. All samples were molded in wooden or steel molds having internal dimensions of 6" by 4" by ⅝". The time that the mixture was allowed to stand in the molds was varied depending upon the type of cement, temperature, accelerator concentration and the like. With REGULATED SET cement, the molding time was approximately 30 minutes at a temperature of approximately 180° to 212° F. With type III portland cement, the molding time was one hour unless stated otherwise.

After the samples were removed from the molds, some were tested immediately and some were allowed to stand for 14 days from the time of initial mixing before being tested for modulus of rupture (MOR). During this 14 day period, the samples were kept at 60° to 80° F. The samples were kept in a humid atmosphere after molding for a few days to prevent water loss. MOR measurements were made using a Dillon tester. The samples measured approximately 4 inches wide by ⅜ inch thick and the span used for the test was 4 inches.

EXAMPLE I

The desirable effects of pre-treating western red cedar fibers with dichromate ion are shown in Table I. A sample of crushed shavings of western red cedar, generally about ¾" by ¼" by 0.02–04", together with water, alum and sodium dichromate, was heated for half an hour in boiling water in a closed glass container. A duplicate sample of western red cedar without dichromate was similarly heated. Calcium chloride was added to both samples to accelerate setting of the portland cement. The dichromate solution used was 10% weight/weight and the calcium chloride solution was 33% weight/weight. After the heat treatment, the material was treated with waterglass and cooled and the Type III portland cement was added in the amount indicated. After thoroughly mixing the cement with the treated fibers, the mixture was placed in molds and pressed to produce test specimens approximately 4" by 6" by ⅜" thick. The final pressure was between about 270 psi and 300psi. After a period of one hour, the molds were opened and the samples allowed to stand open to air at ambient conditions for 14 days for further curing of the cement. They were tested for their moduli of rupture using a Dillon tester as described above. The sample made with sodium dichromate had far superior strength.

EXAMPLE II

Although douglas fir is far less difficult than cedar to bond with Type III portland cement, such a composite can be improved substantially in strength with the dichromate treatment especially if the fir is freshly cut. Such treatment is very important for fast, high temperature molding. Fir planer shavings less than a month old hammermilled with a 3/16" screen were used to make test samples with results shown in Table II. In all cases the samples were pressed for one hour at about 400 psi at 200°–212° F., and then tested two weeks later.

EXAMPLE III

Similar improvements can be obtained with the fast setting REGULATED SET cement. The strength of these composites, however, were not quite as high in the case of cedar fiber as with Type III cement, but were very good in the case of hammermilled douglas fir fibers. These results are shown in Table III. Hammermilled planer shavings of wood, either cedar tow or douglas fir; about 1" or less in length and about ⅛" or less in width were used. The shavings were added to 10% w/w potassium dichromate solution, along with water, 20 grams of slaked lime, and 120 grams of REGULATED SET cement. The mixed portions were compressed in steel molds at approximately 500 psi. The compressed composites were then removed from the molds and allowed to cure in ambient conditions for 14 days prior to testing.

Since REGULATED SET has a very rapid rate of set, it is necessary to add a controlling chemical. Slaked lime appears to be slightly better than plaster paris for this purpose in these samples. Samples 8-10-4 and 8-10-5 were cured for 30 minutes in a steel mold in steam at atmospheric pressure. The others were cured at room temperature overnight.

EXAMPLE IV

In Table IV, the effect of varying the ratio of cedar tow (hammermilled with ¼" screen) to Type III portland cement is shown. The cedar fibers, which had a moisture content of 10.8%, were first treated with 4% of their weight of sodium dichromate dihydrate in water. Calcium chloride in proportion of 5% of the cement presented was also added. Sample 10-8-1 was held under 300 psi for 12 hours, the other pressed at 600 psi for the same period. All were cured for 14 days prior to strength testing. As shown in the table, effective strengths can be obtained over a relatively wide range of cement/fiber ratios but they appear to peak around 1.6:1 in these cases.

EXAMPLE V

A further example of the method of the present invention is set out hereafter:

| Sample Composition (Sample 2-159-4) | |
|---|---|
| Cedar tow, hammermilled with ¼" screen moisture content 30.5% | 141 g. |
| Alum solution (20% w/w) | 18 ml. |
| Sodium dichromate dihydrate solution (10% w/w) | 39 ml. |
| Waterglass solution (1 part 40° Be/2 parts water) | 39 ml. |
| Calcium chloride solution (33% w/w) | 6.5 ml. |
| Type III portland cement | 108 g. |
| Procedure | |
| 1. The dichromate and alum solutions were mixed, then added to the cedar fiber, mixed thoroughly therewith and let stand for 30 minutes at 100° F. | |
| 2. Next the waterglass solution was added. | |
| 3. Next the calcium chloride solution was added. | |
| 4. Finally the portland cement was added. | |
| 5. The mixture was pressed in steel molds of internal dimensions of 6" by 4" by ⅜" (pressure to close the mold was 460 psi). | |
| 6. The mold was maintained in a closed container over boiling water vented to atmospheric pressure for 60 minutes. | |
| 7. The sample was then removed from the mold and allowed to cure at ambient room conditions for 14 days. | |

The final product had a density of 68 pounds per cubic foot and MOR of 1448 psi.

EXAMPLE VI

In Table V the effects of adding sulfite to various samples of hammermilled fir planer shavings are shown. In one case (7-199-1) sodium sulfate, which is the oxidation product of sodium sulfite, was added to see if this compound was the cause of the significant increase in strength resulting from sulfite addition. The tests showed the product with sodium sulfate had less strength than the same product using sodium sulfite, but either additive caused an increase in strength over the control, Sample No. 8-229-4, see Table V.

EXAMPLE VII

The effect of quantity of the triethanolamine (TEA) on the strength of the composite is shown in Table VI. The need for carefully maintaining a low concentration of the TEA is evident.

EXAMPLE VIII

Still another example of the present invention is set out hereafter.

| Sample Composition (Sample 8-289-1) | |
|---|---|
| Fir hammermilled planer shavings, ¼" screen, moisture content = 26.4% | 90 g. (OD) |
| Sodium thiosulfate trihydrate | 5 g. |
| Alum solution 20% w/w aluminum sulfate | 20 ml. |
| Water | 10 ml. |
| Sodium dichromate dihydrate solution | 15 ml. |
| Waterglass solution, 2:1 water:41° Be' sodium silicate | 30 ml. |
| Type III portland cement | 135 g. |
| Triethanolamine solution 1% w/w | 14 ml. |
| Procedure | |
| 1. The alum and sodium thiosulfate solution were mixed and immediately thereafter mixed with the fir. | |
| 2. Allowed to stand 5 minutes at room temperature with frequent stirring. | |
| 3. The dichromate solution added and the mixture heated 15 minutes in steam bath. | |
| 4. Thereafter cooled waterglass mixed in, then the Type III cement. | |
| 5. The solution of triethanolamine quickly added and mixed. | |
| 6. Pressed into a steel mold having a cavity of approximately 4" by 6" by ⅞", using a pressure of 500 psi to bring the thickness just to ⅝". | |
| 7. Placed in a humid atmosphere at a temperature of 150 to 170° F. and held there under pressure for one hour. | |
| 8. The sample was removed from the mold and lightly sprayed with about 3 ml. of water to assure a moist condition, then stored in a water vapor tight container for 2 days at 90–100° F. | |
| 9. Thereafter it was removed from the container and allowed to stand under ambient room conditions for 14 days to complete the cement cure. | |

The final product had a density of 72 pounds per cubic foot and a MOR of 1536 psi.

EXAMPLE IX

The beneficial effect of potassium permanganate treatment was shown in other tests set forth in Table VII. In these tests oven dried cedar shavings hammermilled with a 3/16" screen were used in the tests, all weights are in grams.

EXAMPLE X

A series of tests were carried out to test the relative effect of using higher concentrations of waterglass with Douglas fir fiber treated with sodium dichromate where the initial press was carried out at high temperatures. The results are shown in Table VIII. In these samples the fiber was prepared by hammermilling with an ⅛ inch screen Douglas fir planer shavings. The waterglass where added was added after treatment of the fibers with sodium dichromate and before the addition of cement. In all instances 3 parts of cement were used for each part of fiber. Sodium dichromate and waterglass (as 41° Be') and hydrochloric acid are expressed as parts by weight. The samples were pressed at 500 p.s.i. and held in a steam atmosphere for twenty-four minutes. They were tested fifteen minutes after removal from the mold.

EXAMPLE XI

The effect of the order of addition of cement and waterglass was tested. As shown in Table IX no significant difference in result occurs. In one procedure (Tests 12-10-1) hydrochloric acid and waterglass were mixed. The resulting gel was mixed with Douglas fir derived fiber. Finally Portland cement was mixed in.

In other samples (Tests 11-60-6 and 11-60-6A) Douglas fir fiber was wetted with water, Portland Cement then mixed with the fiber, and finally a mix of waterglass and hydrochloric acid added.

In still other samples (Tests 11-60-5 and 11-60-5A) Douglas fir fiber was wetted with hydrochloric acid. Waterglass was then mixed with the fiber and finally Portland cement added.

In all instances 3 parts of Type III Portland cement, 0.36 parts of 41° Be' waterglass, 0.36 parts 2.5 N hydrochloric acid, and approximately 1.32 parts water were used for each part of fiber.

After mixing the samples were placed under an initial 500 p.s.i. pressure and heated in steam for 24 minutes. Samples retained for a two week test were placed in plastic bags and held at room temperature.

EXAMPLE XII

Another series of tests were conducted with Douglas fir fiber to determine the effect of different amounts of waterglass. The fiber was prepared by hammermilling planer shavings using an ⅛ inch screen. Parts will be given by weight. One part of fiber (oven dry basis) previously washed with boiling water was mixed with 2.5 N hydrochloric acid and then a dilute solution of 41° Be' waterglass. Thereafter 3 parts of Type III cement was mixed in, samples were placed in molds and pressed to an initial 500 p.s.i. and placed for twenty minutes in an atmosphere of live steam. Fifteen minutes after removal from the steam some samples were tested. Others were placed in plastic bags and tested after two weeks at room temperature. These tests, as shown in Table X, demonstrated increasing amounts of sodium silicate gave increasing out-of-the-mold strength, but that the two week strength peaked at about sixteen percent waterglass.

EXAMPLE XIII

Tests were carried out to determine if calcium chloride, a known set accelerator, could give the same beneficial effects as does the addition of waterglass. In one sample (10-30-2), one part of water washed fir was mixed with three parts of Type III cement, 0.06 parts calcium chloride, and one and one-half parts of water. In another sample (10-30-3), the calcium chloride was omitted and 0.36 parts of hydrochloric acid, then 0.36 parts of sodium silicate were substituted. Both samples were pressed to an initial pressure of 500 p.s.i. and subjected to an atmosphere of steam for twenty minutes, and then removed from the mold. When tested one hour later, sample 10-30-2 with the calcium chloride had an MOR of 21. Sample 10-30-2 had an MOR of 334.

EXAMPLE XIV

As shown in Table XI, sodium silicate when used in combination with sodium dichromate treatment of western red cedar fibers, enhances the out-of-mold strength substantially. In these tests, western red cedar hammermilled planer shavings, ⅛ inch screen, were treated with sodium dichromate. Acidified sodium dichromate solutions (by addition varying amounts of sodium dichromate to 2.5 N hydrochloric acid) were added to the cedar. Then, after reaction was essentially complete, an aqueous solution of 41° Be' waterglass was added. Finally, Type III cement was added. The samples were pressed at 500 p.s.i. initial pressure and held for 24 minutes in atmospheric steam. solution of 41° Be' waterglass was added. Finally, Type III cement was added. The samples were pressed at 500 p.s.i. initial pressure and held for 24 minutes in atmospheric steam.

In summary, in accordance with our rapid set process the cement/fiber/high ratio silicate mixture is set under high temperature (preferably 175°-180° F.) and high pressure. This temperature should be reached within twenty minutes or less. This enables the product to gain sufficient strength to be removed from the mold and processed. Moreover, the product will continue a rapid rate of cure and will attain within twenty four hours eighty percent of its ultimate strength. High strength of product can only be obtained, however, when substantial amounts of silicate are utilized. For example, twelve percent waterglass is necessary with Type III portland cement to obtain maximum fourteen day strength with untreated Douglas fir fiber.

The Manufacturing Process

The following discussion taken in conjunction with FIG. 1 will provide an understanding of the overall operation of a suitable manufacturing process of the present invention. This example describes the procedure for making roofing shingles approximately sixteen inches long, of various widths, and having a shape and thickness similar to shingles typically sawn from cedar wood. Modifications in the various equipment and other details described which may be necessary to produce other composite building materials such as siding will occur to persons skilled in the art.

The wood fibers (douglas fir, western red cedar, or pine, etc.) are mechanically prepared in a conventional manner. Plane shavings or flaked shavings may be utilized. These shavings can be reduced in size by running them through a hammermill or through a disk refiner. For shingles, wood particles produced by hammermilling and passing a $\frac{1}{8}''$ screen are preferably used. However, a wide variation in particle sizes may be used according to the present invention depending upon the desired characteristics of the end product.

After a pre-curing period, if such is utilized, the mixture is agitated in a suitable mixer and delivered to a dispensing hopper 10 (FIG. 1). Wood fiber/portland cement mixture delivered from the dispensing hopper is formed into a product mat 12 of proper size and weight on a horizontal conveyor 14. Generally the mat is wide enough to form several shingles thereacross. The mat is relatively thick, and uncompressed at this point. The conveyor 14 transports the uncompressed mat 12 onto a second conveyor 16 which carries the mat under a compression roll 18. The blanket is compressed to a predetermined thickness by the roll 18 to provide mat integrity for subsequent operations. For example the compression at this point may reduce the mat 12 to approximately fifty percent of its original thickness.

The conveyor 16 then moves the compressed mat 12 under a reciprocating knife 20 which cuts the mat into discrete portions 12' which are long enough so that the finished shingles will be approximately 16 inches in length when completely cured. The portions 12' of the mat are carried by the second conveyor 16 to a caul plate applicator 22 where a bottom caul plate 24 is placed underneath each portion 12' of the mat, and a top caul plate 26 is placed on top of each portion. The caul plates 24 and 26 may be of aluminum or other metal, such as iron or steel, and are large enough to enclose the portion 12'. The caul plates are embossed to give the product its desired shape and prevent the mat portions 12' from sticking to the platens of the later described stack press. In addition, the caul plates serve as carriers by which the portions of the mat are carried through the multiple stations of the equipment to be formed into shingles.

Preferably a suitable caul plate release agent, such as zinc stearate or Teflon coating, is used to prevent the mat portions 12' from sticking to the caul plates. The caul plates present a smooth base to the mat portions 12' and this insures a flat, smooth surface on the cured shingles. The caul plates are configured to form several shingles across a mat portion which is later sawed apart.

The now sandwiched mat portions 12' are deposited upon a conventional stack press loader 28. It may comprise a platform portion 30 upon which each of the sandwiched mat portions 12' is sequentially positioned. A hydraulically operated plunger 32 raises or lowers the sandwiched mat portions to the bottom of a multiple opening vertical stack press 34. The construction of the stack press will not be described since it does not comprise part of the present invention. Typical stack press designs are disclosed in U.S. Pat. Nos. 3,126,578; 3,478,137; 3,542,629; and 4,148,857.

The pairs of caul plates 24 and 26, each loaded with a mat portion 12' sandwiched therebetween are conveyed sequentially into the entrance position at the bottom of the stack press. The stack press 34 in general comprises a series of vertically spaced pairs of heated platens. The loaded pairs of caul plates are received in the openings defined between the pairs of platens. After each of the openings has received a loaded pair of caul plates, the press is then operated so as to apply heat and pressure uniformly to the just inserted mat portion 12'. Preferably the press is heated internally so that the heat from the platens will insure that the mat portions will be heated to and maintained at a temperature of approximately 200° F. while they are in position throughout the stack press. The product is preferably enveloped in an atmosphere of live steam at a temperature of approximately 200° F. while in the press.

As each mat portion 12' sandwiched between upper and lower caul plates 26 and 24 is received in the entrance opening at the bottom of the stack press 34 it is pressed to suitable stops, preferably at a pressure of about 150 to 500 psi. Preferably the volume of the mat portions is reduced during the initial compression to below that required for the final product. Thereafter the portions are allowed to expand slightly to establish their final product volume. This permits the final product volume to be maintained with considerably less pressure than required to effect the initial product volume in the first place. The pressure required after the initial compression can be supplied by the weight of the loaded caul plates stacked above a given mat portion. The portions are maintained under pressure for a predetermined time interval which is sufficient to insure that their dimensional integrity will be preserved upon release from the stack press. Again, this time interval is determined experimentally depending upon the composition of the wood fiber/portland cement/dichromate/waterglass mixture. As previously indicated, however, by coordinating the steps of the mechanical process precisely with the curing curve, the total molding time can be reduced to two hours or less.

The stack press 34 is preferably one constructed so that the loaded caul plates are released at the top of the stack press and are removed one at a time as a unit without releasing pressure on the entire stack. When removed from the top of the stack press the loaded caul plates are received by a conventional stack press unloader 36 which may have a construction similar to the stack press loader 28. The loaded caul plates are lowered by the unloader 36 to the work floor level where the compressed shingles are removed from the caul plates by suitable means such as a vacuum lift.

The shingles are then passed through suitable saws to trim their edges. Normally since the mat portions 12' are each compressed into a plurality of shingles the now compressed mat portions must be cut into individual pieces. The individual shingles may now undergo further fabrication which may include waterproofing through use of stearates and other similar materials. The caul plates pass by another conveyor (not shown) through a cleaning station and to a station where caul plate release agent is again applied. Thereafter the caul plates are recycled to form additional shingles. The shingles may be secured together in bundles so that after sufficient curing at ambient conditions (60° to 80° F.), they may be shipped.

A modification of the above arrangement is preferably utilized. In this arrangement a series of molds may be carried beneath a dispensing hopper and filled with the material to be pressed similarly to the procedure described above. After compression and trimming of the excess material from the molds, they can be passed over a scale to ascertain that each is loaded with a sufficient amount of material. Thereafter, the plurality of the molds are stacked in a group of a desired number which may be, for example, twenty-four molds. These are pressed together in a conventional hydraulic press and stress rods applied to maintain the stack in its compressed condition. This stack is then passed through a heating tunnel in which a steam atmosphere is maintained so as to heat the molds and, more particularly, the portland cement-fiber mixture to the desired setting temperature. After a proper time within the oven, the stacks are discharged and disassembled and the molded products removed from the molds which can then be recycled for further processing. The molded products are trimmed and subjected to such further fabrication as may be desired.

Having described preferred embodiments of the composition of matter, improved building materials, and method of producing the same, it will be apparent to those skilled in the art that the invention permits of modification in both arrangement and detail. However, the present invention should be limited only in accordance with the scope of the following claims.

TABLE I

| Sample | Wood OD g. | MC % | Alum g. | Sodium Dichromate g. | Water-glass g. 41° Be' | Calcium Chloride g. | Water (all sources) g. | Cement Type III g. | Product Density lb/ft³ | MOR psi |
|---|---|---|---|---|---|---|---|---|---|---|
| 2-169-1 | 97 | 9.6 | 3.6 | None | 12.7 | 5.5 | 107 | 109 | 55 | 497 |
| 2-169-2 | 97 | 9.6 | 3.6 | 4.3 | 12.7 | 5.5 | 107 | 109 | 62 | 1157 |

TABLE II

| | | | | Beneficial Temperatures | | | | | | |
|---|---|---|---|---|---|---|---|---|---|---|
| Sample | Fir OD g. | Hammermill Screen Size | MC % | Alum g. | Sodium Dichromate g. | Water-glass g. 41° Be' | Calcium Chloride g. | Water all sources g. | Cement Type III g. | Product Density lb/ft³ | MOR psi |
| 3-189-1 | 95 | 3/16" | 23.2 | 2.8 | None | 9.8 | 3.8 | 103 | 104 | 58 | 268 |
| 3-189-2 | 95 | 3/16" | 23.2 | 2.8 | 3.4 | 9.8 | 3.8 | 101 | 104 | 63 | 1106 |
| 4-279-2 | 70 | 3/16" | 18.6 | 2.9 | 2.4 | 10 | 5.0 | 80 | 162 | 74 | 1080 |
| 4-279-3 | 70 | 3/16" | 18.6 | 2.9 | None | 10 | 5.0 | 82 | 162 | 62 | 386 |

TABLE III

| Sample | Cedar Tow (grams oven dry basis) | Fir (grams oven dry basis) | 10% Potassium Dichromate (grams) | Water (grams, all sources) | REGULATED SET (grams) | MOR (PSI) |
|---|---|---|---|---|---|---|
| 7-11-2 | — | 75 | 3.6 | 100 | 120(a) | 1328 |
| 7-11-4 | — | 75 | — | 100 | 120(a) | 786 |
| 7-29-3 | 54 | — | — | 90 | 120(b) | 157 |
| 7-29-4 | 54 | — | 3.6 | 100 | 120(b) | 744 |
| 8-22-1 | — | 75 | 3.6 | 100 | 120(b) | 1418 |
| 8-10-4 | — | 73 | — | 100 | 120(c) | 800 |
| 8-10-5 | — | 73 | 3.0 | 100 | 120(c) | 1018 |

(a) 20 g. lime added to control set
(b) 5.4 g. plaster paris added to control set
(c) mixture of 10 g. lime and 10 g. plaster paris added to control set

TABLE IV

| Sample | Cedar Tow (grams) (a) | Sodium Dichromate (grams) | Calcium Chloride (grams) | Water (grams, all sources) | Cement Type III (grams) | Ratio Cement/ OD Cedar | Density (lb./ cu. ft.) | MOR (PSI) |
|---|---|---|---|---|---|---|---|---|
| 10-8-1 | 62 | 2.3 | 6.0 | 100 | 120 | 1.9 | 63 | 942 |
| 10-8-2 | 68 | 2.6 | 5.7 | 99 | 114 | 1.7 | 62 | 1240 |

TABLE IV-continued

| Sample | Cedar Tow (grams) (a) | Sodium Dichromate (grams) | Calcium Chloride (grams) | Water (grams, all sources) | Cement Type III (grams) | Ratio Cement/ OD Cedar | Density (lb./ cu. ft.) | MOR (PSI) |
|---|---|---|---|---|---|---|---|---|
| 10-8-3 | 73 | 2.7 | 5.4 | 98 | 109 | 1.5 | 60 | 1209 |
| 10-8-4 | 78 | 2.9 | 5.2 | 94 | 104 | 1.3 | 55 | 1021 |

TABLE V
EFFECT OF SULFITE TREATMENT OF FIBERS ON STRENGTH OF PRODUCT

| Sample No. | Fiber (grams) | Sodium Sulfite (grams) | 20% Alum (ml.) | 20% Sodium Dichromate (ml.) | Water (ml.) | Sodium Sulfate (grams) | 2:1 40° Be' Waterglass (ml.) | Type III Cement (grams) | Mold Pressure (psi) | MOR |
|---|---|---|---|---|---|---|---|---|---|---|
| 8-229-4 | 80(b) | — | 20 | 20 | 14 | — | 40 | 135 | 500 | 1209 |
| 8-229-5 | 80(b) | 4.7 | 20 | 20 | 14 | — | 40 | 135 | 500 | 1520 |
| 7-199-1 | 100(a) | — | 20 | 15 | 30 | 7.5 | 40 | 130 | 500 | 1399 |
| 7-199-2 | 100(a) | 4.0 | 20 | 15 | 30 | — | 40 | 130 | 500 | 1589 |
| 8-39-4 | 100(c) | 4.0 | 20 | 15 | 45 | — | 40 | 130 | 500 | 1802 |

(b)Fir hammermilled planer shavings ⅜" screen, moisture = 26.4%
(a)Fir hammermilled planer shavings ¼" screen, moisture = 10.4%
(c)Fir hammermilled planer shavings ⅜" screen, moisture = 11.6%

TABLE VI

| Sample (a) | Triethanolamine (% of cement present) | MOR |
|---|---|---|
| 8-309-1 | 0.10 | 1582 |
| 8-309-2 | 0.25 | 1287 |
| 8-309-3 | 0.40 | 1087 |
| 8-309-4 | — | 1271 |

(a) All samples consisted of 90 g. fir hammermilled planer shavings ¼" screen, mixture content = 26.4%, 20 ml. of 20% w/w alum, 15 ml. of 20% w/w sodium dichromate, 10 ml. water, 20 ml. of 2:1 diln. of 41° Be', waterglass, and 135 g. Type III cement. Measured amounts of triethanolamine were added in a total of 14 ml. of water in each case.

TABLE X

| Sample | 41° Be' Sodium Silicate-% by wt. of portland cement | Average sample thickness-in. Out of mold | Average sample thickness-in. At break time | Average sample thickness-in. Change | MOR 15 Min. out of mold | MOR After 14 days |
|---|---|---|---|---|---|---|
| 10-150-5 | 0 | 0.586 | 0.611 | +0.025 | 20 | 532 |
| 10-150-6 | 4 | 0.563 | 0.576 | +0.013 | 23 | 878 |
| 10-150-7 | 8 | 0.554 | 0.558 | +0.004 | 62 | 1262 |
| 10-150-8 | 16 | 0.557 | 0.562 | +0.005 | 213 | 1490 |
| 10-150-9 | 24 | 0.582 | 0.582 | 0 | 284 | 1407 |

TABLE VII

| Sample No. | Cedar g. | Alum g. | $KMnO_4$ g. | Water-glass g. | Calcium Chloride g. | Water g. | Cement Type III g. | Closing Pressure (psi) | Density lb/ft² | MOR |
|---|---|---|---|---|---|---|---|---|---|---|
| 4-149-1 | 85 | 6.2 | 3 | 20 | 3 | 96 | 114 | 330 | 61 | 599 |
| 4-149-2 | 85 | 6.2 | — | 20 | 3 | 96 | 114 | 350 | 58 | 292 |

TABLE VIII

| Sample No. | Fiber (OD) g. | 2.5 N HCl ml. | Sodium Dichromate g. | 41° Be' Waterglass g. | Water All Sources Except Waterglass ml. | Cement Type III g. | MOR 15 min. Out of Mold |
|---|---|---|---|---|---|---|---|
| 11-250-2 | 50 | 18 | 0 | 18 | 67 | 150 | 128 |
| 11-250-2A | 50 | 18 | 0 | 18 | 67 | 150 | 125 |
| 11-250-5 | 50 | 18 | 0 | 18 | 67 | 150 | 140 |
| 11-250-3 | 50 | 18 | 1.6 | 18 | 67 | 150 | 158 |
| 11-250-3A | 50 | 18 | 1.6 | 18 | 67 | 150 | 145 |
| 11-250-4 | 50 | 18 | 1.6 | 18 | 67 | 150 | 161 |

TABLE IX
Effect of Order of Addition of Silicate

| Sample | MOR After 15 min. | MOR After 2 weeks |
|---|---|---|
| 11-60-5 | 156 | |
| 11-60-5A | | 1563 |
| 12-10-1 | 172 | |
| 11-60-6 | 178 | |
| 11-60-6A | | 1404 |

| Parts by weight | Ingredient |
|---|---|
| 0.33 | Fir, hammermilled planer shavings, ¼ in screen; washed with boiling water; OD basis |
| 0-0.18 | 2.5 N Hydrochloric acid |
| 0-0.18 | 41° Be' waterglass |
| 1.0 | Portland cement |
| 0.5 | Water from all sources |

TABLE XI

Effect of sodium silicate concentration on the initial strength of composites containing western red cedar

| Sample | Sodium Dichromate % of OD Cedar | Sodium Silicate as 41° Be' Waterglass % of Cement | Out of Mold | Thickness After 15 min. | Change | MOR After 15 min. |
|---|---|---|---|---|---|---|
| 11-200-1 | 3 | 0 | 0.644 | 0.668 | +0.024 | 20 |
| 11-200-2 | 3 | 7.4 | 0.621 | 0.624 | +0.003 | 174 |
| 11-200-3 | 3 | 16 | 0.652 | 0.655 | +0.003 | 293 |
| 11-200-4 | 3 | 23 | 0.662 | 0.664 | +0.002 | 241 |
| 11-200-5 | 0 | 7.4 | 0.625 | 0.636 | +0.011 | 30 |

Initial Set Condition: 24 min. in atmospheric stem, mold pressure 500 p.s.i.

Sample Compositions:

| Parts by weight | Ingredient |
|---|---|
| 1 | Western red cedar hammermilled planer shavings, ¼" screen |
| 0.22–0.66 | 2.5 N. Hydrochloric acid |
| 0.03 | Sodium dichromate |
| 0.22–0.70 | 41¼ Be' waterglass |
| 1.7 | Water all sources |
| 3 | Type III cement |

We claim:

1. In a method of producing composite materials from plant fibers containing water-soluble compounds and portland cement the step comprising contacting the plant fibers with a material selected from the class consisting of dichromate ion and permanganate ion to substantially negate the adverse effects of the water-soluble compounds in the plant fibers on the setting of the cement.

2. A method of producing composite materials from portland cement and plant fibers containing cement set inhibiting compounds comprising:
   contacting plant fibers with dichromate ion;
   mixing the treated plant fibers with portland cement and water;
   molding the mixture into a predetermined configuration; and
   curing the molded mixture.

3. The method of claim 2 wherein the plant fibers are wood fibers.

4. The method of claim 3 wherein the plant fibers are contacted with an aqueous solution containing dichromate ion in an amount ranging from approximately 0.5% to 8% of the oven dry weight of the plant fibers.

5. The method of claim 3 wherein the ratio of portland cement to plant particles is approximately 0.5:1 to approximately 4:1 according to weight.

6. The method of claim 2 wherein the water to cement ratio is approximately 0.5 to approximately 2 according to weight.

7. The method of claim 2 wherein the plant fibers are contacted in an acidified aqueous solution containing dichromate ion for a period of time sufficient to permit the dichromate ion to react effectively with the cement set inhibiting compounds at or near the surface of the plant fibers.

8. The method of claim 2 wherein the fibers are contacted with a sulfite solution prior to treating them with dichromate ion.

9. The method of claim 2 wherein the plant fibers are contacted in an aqueous solution containing the dichromate ion and also containing aluminum sulfate in an amount ranging from approximately 0.5% to approximately 6% of the oven dry weight of the plant fibers.

10. The method of claim 2 and further comprising the step of adding calcium chloride to the mixture prior to molding in an amount ranging from approximately 0.5% to approximately 5% of the weight of the cement.

11. The method of claim 2 wherein triethanolamine is added to the mixture prior to molding the same.

12. The method of claim 2 wherein the mixture is molded under compression at approximately 150 psi to approximately 600 psi.

13. The method of claim 12 wherein the compression is carried out at a temperature of between about 100° F. and 220° F.

14. The method of claim 13 wherein the compression is carried out in a substantially saturated atmosphere.

15. The method of claim 2 wherein the fibers are western red cedar.

16. The method of claim 2 wherein the fibers are douglas fir.

17. The composite material produced by the method of claims 2, 3, 4, 5, 6, 7, 8, 9, 10, 11, 12, 13, 14, 15 or 16.

18. A method of producing composite material comprising the steps of:
   contacting plant fibers containing cement set inhibiting compounds with an aqueous solution containing dichromate ion in an amount ranging from approximately 0.5% to approximately 8% of the oven dry weight of the plant fibers and aluminum sulfate in an amount ranging from approximately 0.5% to approximately 6% of the oven dry weight of the plant fibers;
   holding the aqueous plant fibers/dichromate/aluminum sulfate mixture for a period of time sufficient to permit the dichromate ion to react effectively with the cement set inhibiting compounds in the plant fibers;
   mixing an alkaline substance into the last mentioned mixture in an amount sufficient to substantially neutralize the mixture;
   mixing portland cement into the last mentioned mixture in an amount sufficient so that the ratio of portland cement to plant fibers is approximately 1:1 to approximately 4:1 according to weight;
   molding the last mentioned mixture into a predetermined configuration; and
   curing the molded mixture.

19. The method of claim 18 wherein the alkaline substance is sodium silicate.

20. The method of claim 18 wherein the ratio of water to cement in the mixture is from approximately 0.3 to approximately 2 according to weight.

21. The method of claim 18 and further comprising mixing calcium chloride into the mixture prior to molding in an amount ranging from approximately 0.5% to approximately 5% of the weight of the cement.

22. The method of claim 18 wherein triethanolamine is added to the mixture prior to molding in an amount of between 0.05 and 0.15% of the portland cement.

23. The method of claim 18 wherein the mixture is molded under compression at approximately 150 psi to approximately 600 psi.

24. The method of claim 18 wherein the plant fibers are western red cedar.

25. The method of claim 18 wherein the plant fibers are douglas fir.

26. A method of producing composite material comprising the steps:
contacting plant fibers containing cement set inhibiting compounds with an aqueous solution containing dichromate ion in an amount ranging from approximately 0.5% to approximately 8% of the oven dry weight of the plant fibers and aluminum sulfate in an amount ranging from approximately 0.5% to approximately 6% of the oven dry weight of the plant fibers;
allowing the aqueous plant fibers/dichromate/aluminum sulfate mixture to stand for a period of time sufficient to permit the dichromate ion to react effectively with the cement set inhibiting compounds in the plant fibers;
mixing an alkaline substance into the last mentioned mixture in an amount sufficient to substantially neutralize the mixture;
mixing portland cement into the last mentioned mixture in an amount sufficient so that the ratio of portland cement to plant fibers is approximately 1:0.5 to approximately 4:1 according to weight and so that the water to cement ratio is approximately 0.5 to approximately 1.2 according to weight, and also mixing calcium chloride into the last mentioned mixture in an amount of approximately 2% of the weight of the cement;
forming the last mentioned mixture into a mat;
cutting the mat into discrete portions;
placing the mat portions between pre-heated upper and lower caul plates;
conveying the caul plates with the mat portions therebetween into a stack press;
compressing the mat portions in the stack press at a psi of from approximately 150 to approximately 600 in an atmosphere of live steam for a period of time sufficient to cause the cement to set sufficiently to prevent the plant fibers returning to their uncompressed position;
removing the upper and lower caul plates and the compressed mat portions from the stack press; and
removing the compressed mat portions from between the upper and lower caul plates.

27. The composite material produced by the method of claims 18, 19, 20, 21, 22, 23, 24, 25 or 26.

28. In a method of producing composite materials from plant fibers and portland cement the steps of mixing together plant fiber, portland cement and a soluble silicate as 41° Be aqueous solution in amount greater than four but less than twenty-four percent by weight, based on the weight of the cement, molding the mixture into a predetermined configuration and while maintaining said molded configuration, rapidly heating the molded mixture to a temperature in excess of 140° F. for a period of time sufficient to effect setting of the mixture to a degree of set whereby said fibers are restrained from movement within said configuration.

29. The method of claim 28 wherein said molded configuration is heated to a temperature of between 175°–180° F.

30. The method of claim 28 wherein said silicate is waterglass and comprises between about eight to twenty-four percent by weight of portland cement.

31. The method of claim 30 wherein said waterglass comprises between about eight to sixteen percent by weight of the weight of the portland cement.

32. The method of claim 30 wherein said waterglass is selected from the class consisting of aqueous solutions of sodium silicate and potassium silicate.

33. The method of claim 28 wherein said fibers are contacted with acidifying agent prior to mixing with the cement and silicate.

34. The method of claim 28 wherein said fibers are contacted with dichromate ion-containing solution prior to mixing with the cement and silicate.

35. The method of claim 28 wherein said plant fibers comprise wood.

36. The method of forming a composite of plant fiber and portland cement which comprises the steps of:
contacting plant fibers with an acidifying solution,
mixing the fibers with a soluble silicate and portland cement, the silicate being present as 41° Be aqueous solution in amount in excess of four but less than twenty-four percent by weight of the weight of portland cement,
placing the resulting mixture under pressure and submitting the same to an atmosphere of steam for a period sufficient to raise the temperature of the mixture to between 140° F. and 200° F.,
thereafter removing the mixture from said atmosphere and releasing the pressure,
thereby to form a substantially dimensionally stable composite of said portland cement and fibers which can cure to full strength without deformation of the composite.

37. The method of claim 2 wherein subsequent to the step of contacting the plant fibers with dichromate ion the plant fibers are subjected to the further step of mixing the fibers with a soluble silicate present as 41° Be aqueous solution in an amount in excess of four but less than twenty-four percent by weight of the weight of the portland cement.

* * * * *

UNITED STATES PATENT AND TRADEMARK OFFICE
CERTIFICATE OF CORRECTION

PATENT NO. : 4,406,703  Page 1 of 2

DATED : September 27, 1983

INVENTOR(S) : Bernard M. Guthrie and Robert E. Torley

It is certified that error appears in the above-identified patent and that said Letters Patent is hereby corrected as shown below:

On the title page:

In the designation of inventors:

Change "Robert B. Torley" to --Robert E. Torley--.

In the References Cited, add the following references:

| | | |
|---|---|---|
| Re. 13,446 | 7/1912 | Wheeler |
| 1,048,616 | 12/1912 | Wheeler |
| 1,201,535 | 10/1916 | Wheeler |
| 1,262,512 | 4/1918 | Kelly |
| 1,471,876 | 10/1923 | Zukoski |

British 107951, dated April 21, 1917

In the specification:

Column 2, line 24, after "fibers" insert --bonded--;

Column 2, line 44, "genate" should be --ganate--;

Column 5, line 41, "In" should be --If--;

Column 6, line 61, "ct" should be --act--;

Column 8, line 28, "vaired" should be --varied--;

Column 10, line 52, delete "were";

UNITED STATES PATENT AND TRADEMARK OFFICE
CERTIFICATE OF CORRECTION

PATENT NO. : 4,406,703

DATED : September 27, 1983

INVENTOR(S) : Bernard M. Guthrie and Robert E. Torley

It is certified that error appears in the above-identified patent and that said Letters Patent is hereby corrected as shown below:

Column 12, line 12, "presented" should be --present--;

In the claims:

Column 24, line 20, after "weight" insert --of the weight--;

Column 24, line 51, after "without" insert --further--.

Signed and Sealed this

Twenty-fifth Day of February 1986

[SEAL]

Attest:

DONALD J. QUIGG

Attesting Officer

Commissioner of Patents and Trademarks